United States Patent [19]
Komowski

[11] Patent Number: 5,722,884
[45] Date of Patent: Mar. 3, 1998

[54] FLAP FOR AN AIR GUIDING DUCT

[75] Inventor: Michael Komowski, Stuttgart, Germany

[73] Assignee: Behr GmbH & Co., Stuttgart, Germany

[21] Appl. No.: 626,073

[22] Filed: Apr. 1, 1996

[30] Foreign Application Priority Data

Apr. 11, 1995 [DE] Germany .................... 195 13 670.5

[51] Int. Cl.[6] ............................................. B24D 13/00
[52] U.S. Cl. ...................................... 454/69; 29/463
[58] Field of Search ................ 454/69; 251/315.16; 29/463

[56] References Cited

U.S. PATENT DOCUMENTS

| | | | |
|---|---|---|---|
| 3,547,152 | 12/1970 | Hess . | |
| 4,398,693 | 8/1983 | Hahn et al. | 249/155 |
| 4,463,931 | 8/1984 | Baughman | 251/298 |
| 4,506,699 | 3/1985 | Tschudin-Mahrer | 137/375 |
| 4,887,520 | 12/1989 | Bauer | 454/155 |
| 4,924,907 | 5/1990 | Palmer | 137/527 |
| 5,257,853 | 11/1993 | Elton et al. | 297/391 |
| 5,368,903 | 11/1994 | Trier | 428/31 |
| 5,499,947 | 3/1996 | Tauber | 454/69 |

Primary Examiner—Harold Joyce
Assistant Examiner—Derek S. Boles
Attorney, Agent, or Firm—Evenson McKeown Edwards & Lenahan, PLLC

[57] ABSTRACT

Two flap halves are made of a plastic material and are connected with one another to form a one-piece injection-molded part by means of a film hinge injection molded along a lateral edge of the two flap halves. The two flap halves are foldable together about a hinge axis of the film hinge and being fixable in this folded-together position by means of fixing elements.

33 Claims, 3 Drawing Sheets

FLAP FOR AN AIR GUIDING DUCT

BACKGROUND AND SUMMARY OF THE INVENTION

This invention relates to a flap for an air guiding duct, particularly for a heating and/or air-conditioning system of a motor vehicle, having a flap body joined together by two flap halves.

From German Patent Document DE 32 27 458 A1, a flap is known for controlling the air flow in a pipe for a heating or air-conditioning system of a motor vehicle which is formed of two flap halves held in mutual contact. The two flap halves are shaped from a thin light metal, their plane surfaces resting flatly against one another. In a surrounding manner, both flap halves each have an outwardly projecting edge, in which case the two edges of the two flap halves also rest against one another. The edges are enclosed by a jointly surrounding seal which consists of rubber and onto which the edges are molded.

It is an object of the invention to provide a flap of the initially mentioned type which can be designed in a fluidically favorable manner but nevertheless has sufficient stability.

This object is achieved in that the two flap halves are made of plastic and are connected with one another to form a one-piece injection molded part by means of a film hinge injection molded part along a lateral edge of the two flap halves, in which case the two flap halves can be folded together about a hinge axis of the film hinge and, by means of fixing elements, can be fixed in this folded-together position. By selecting a plastic material for manufacturing the two flap halves and by connecting the two flap halves by means of a film hinge to form a one-piece component, it becomes possible to manufacture the flap in a one-step injection molding operation by means of a common tool mold for both flap halves. By manufacturing the flap by means of an injection molding process, it is also possible to construct the flap according to fluidic aspects. By means of the solution according to the invention, it becomes possible to manufacture flap shapes which are individually adapted to the respective functional requirements.

As a further development of the invention, the two flap halves are constructed in a half-shell shape and complement one another in their folded-together position to form a hollow body with a fluidically favorable outer contour. As a result, a flap shape is created which is optimized according to fluidic aspects and which, in particular, may have a guiding surface profile or drop profile.

In a further development of the invention, the interior sides of the half-shell-shaped flap halves are provided with mutually corresponding reinforcing ribs for reinforcing the hollow body. In addition to the possibility of fluidically optimizing the flap, by means of this further development, a sufficient stability of the flap is achieved.

In a further development of the invention, mutually corresponding parts of a detent connection are injection molded as fixing elements on both flap halves. As a result, the fixing elements are also connected in one piece with the flap.

In a further development of the invention, bearing bushes for the bearing of the flap are injection molded in one piece to at least one flap half. This further reduces the number of parts for the functionally appropriate mounting of the flap.

In a further development of the invention, in the area of a bearing bush, an adjusting lever is also injection molded on in one piece in the area of a bearing bush for the purpose of swivelling the flap. As a result, all essential function elements are molded to the one-piece injection molded part of the flap.

In a further embodiment of the invention, the outer contour of the hollow body formed by the flap halves is sheathed by an elastomeric sealing mass, particularly a foamed material. As a result, manufacturing tolerances of the flap are compensated and a good sealing effect of the flap function is achieved in a corresponding air guiding duct.

In a further development of the invention, outward-projecting surrounding sealing webs are molded to both flap halves along their lateral edges, which sealing webs are provided with recesses distributed along the circumference of the sealing webs for injection molding an elastomeric surrounding sealing lip thereto. By means of the sealing webs, which are molded on in one piece, the basis is created for a simple spraying-around of the sealing lip which is also held securely on the sealing webs by the form-fitting molding into the recesses.

Other objects, advantages and novel features of the present invention will become apparent from the following detailed description of the invention when considered in conjunction with the accompanying drawings.

DETAILED DESCRIPTION OF THE DRAWINGS

A flap 1 according to FIGS. 1 to 4 is used for controlling an air flow in an air guiding duct of a heating and/or air-conditioning system of a motor vehicle. In a manner not shown, the flap 1 is disposed in opposite walls of such an air guiding duct so that it can be swivelled about its swivelling axis 2. The flap 1 can be swivelled continuously in the air guiding duct between a position which releases the air flow through the air guiding duct and a position which closes off the air guiding duct. The flap 1 is made of a plastic material, preferably of thermoplastic material, and has two half-shell-shaped flap halves 3, 4 which complement one another to form a fluidically favorably formed hollow body with a drop-type profile. In this case, the flap 1 is designed such that, in its open position releasing the flow through the air guiding duct, it is aligned in the air flow in such an aerodynamically favorable manner that it has a low drag coefficient.

By means of a film hinge 6, the two flap halves 3, 4 are connected with one another in one piece. The film hinge 6 is provided on a lateral front edge of the flap 1 and thus also of the two flap halves 3, 4 which, in the position of the flap 1 opened in the air guiding duct, projects against the air flow.

The film hinge 6 extends along the whole width of the two flap halves 3, 4. About a hinge axis formed by the film hinge 6, the two flap halves 3, 4 can be folded together from a tool position, in which they are situated in a common plane (FIG. 2), in a closing direction (S) (FIG. 3) into the position according to FIG. 1. In this case, the two flap halves 3, 4 are constructed to be essentially symmetrical to one another so that they are disposed on one another in a flush manner in the folded-together position.

Figure 1:
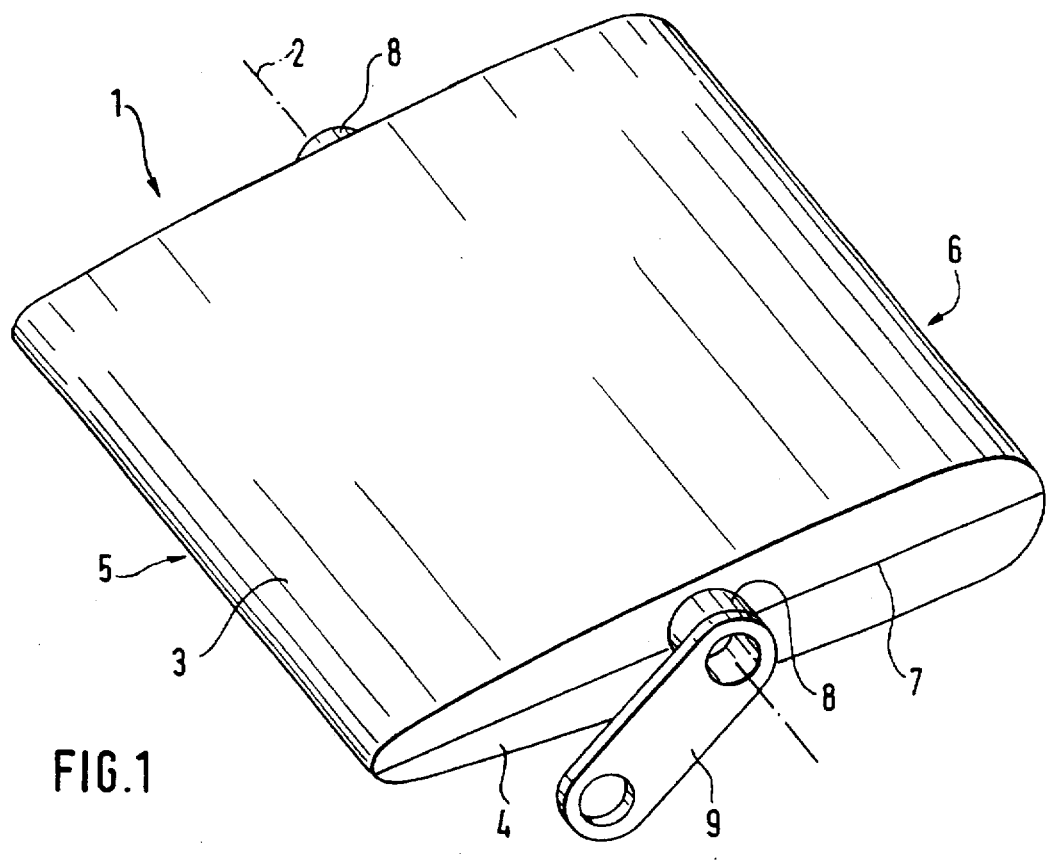
FIG. 1 is a perspective representation of an embodiment of a flap according to the invention which consists of two flap halves to which two bearing bushes and one adjusting lever are molded.

On the front side of the flap 1 situated opposite the film hinge 6, the two flap halves 3, 4 are provided with fixing elements in the form of a detent connection C1, C2. In this case the detent connection has at least one detent hook C1 on one of its two flap halves 3, 4 as well as at least one corresponding detent point C2 on the opposite flap half 3, 4 which form-fittingly engage in one another when the flap halves 3, 4 are closed in the folded-together position of the flap 1 (FIG. 1). Preferably, the detent connection is provided in the area of the interior sides of the flap halves 3, 4 so that it is invisible in the folded-together position of the flap 1 and represents no flow resistance for the outer contour of the flap 1.

Both flap halves 3, 4 are provided on their interior sides with grid-type ribbings in the form of four reinforcing ribs 12 or 14 respectively extending longitudinally in the flow direction as well as three reinforcing ribs 11 or 13 respectively extending transversely to the flow direction. The reinforcing ribs 11 to 14 are molded in one piece to the interior sides of the flap halves 3, 4. The reinforcing ribs 11, 12 and 13, 14 of the two flap halves 3, 4 are arranged symmetrically with respect to the hinge axis of the film hinge 6 in such a manner that respective assigned reinforcing ribs 11, 13 or 12, 14 rest on one another in the folded-together position of the flap 1. In this case, all top sides of the reinforcing ribs 11 to 14 in the folded-together position of the flap 1 end in a common parting plane 7 so that the respective opposite reinforcing ribs 11, 13; 12, 14 adjoin one another in a flush manner. As a result, the two flap halves 3, 4 support one another along the whole surface of the grid-type ribbings. By means of this ribbing, an extremely stable flap 1 is therefore provided which has a high stability with respect to torsional and bending stress.

On the flap half 4, two bearing bushes 8 are molded on in one piece coaxially to the swivelling axis 2 on opposite sides of the flap half 8, which bearing bushes 4 project toward the outside from the respective lateral wall of the flap half 4. In this case, the two bearing bushes 8 each represent hollow-cylindrical projections which are injection molded to the flap half 4. So that the folding-together of the two flap halves 3, 4 is not impaired by the bearing bushes 8, two semicircular recesses 10 are provided on the other flap half 3 at the level of the bearing bushes 8 in both lateral walls of the flap half 3, the diameters of these recesses 10 being precisely adapted to the outer contour of the bearing bushes 8. In addition, on one of the two bearing bushes 8, a radially outward-projecting adjusting lever 9 is injection molded in one piece and, in the mounted condition of the flap 1, in a manner known per se, is connected to a control device assigned to the air guiding duct and contributes to the transmission of the control movement of the control device to a swivel movement of the flap 1, in the illustrated embodiment, the bearing bushes 8 are used for the bearing of flap ! in opposite walls of the air guiding duct. The adjusting lever 9 for swivelling the flap 1 in the air guiding duct is arranged outside the air guiding duct.

For both flap halves 3, 4, including the bearing bushes 8 and the adjusting lever 9, a common tool mold is provided.

Figure 2:
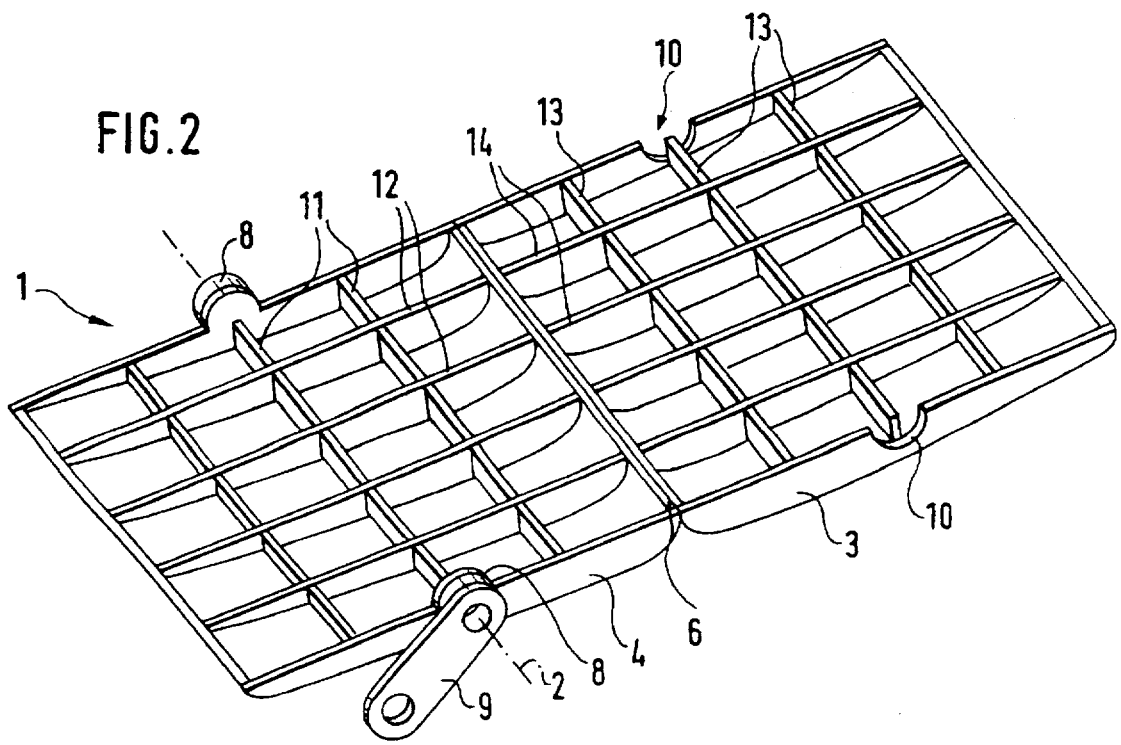
FIG. 2 is a view of the flap according to FIG. 1 in a folded-open position in which the ribbings provided in the interior of the flap halves can be recognized.

The tool mold is designed such that the two flap halves 3, 4, in their position illustrated in FIG. 2, that is, in a common plane, are injection molded with the simultaneous formation of the film hinge connecting them. The tool mold can be held in a relatively simple manner because cores or similar devices required for the removal from the injection mold must be provided only for the eye in the adjusting lever 9 and possibly for the two bearing bushes 8. The whole flap 1, including the two flap halves 3, 4, the film hinge 6, the two bearing bushes 8, the detent connection C1, C2 and the adjusting lever 9, can therefore be manufactured in a one-step injection molding process by means of a common tool as a one-piece injection-molded part. According to the design of the tool mold, different flap shapes can be achieved which are adapted to the respective requirements.

Figure 4:
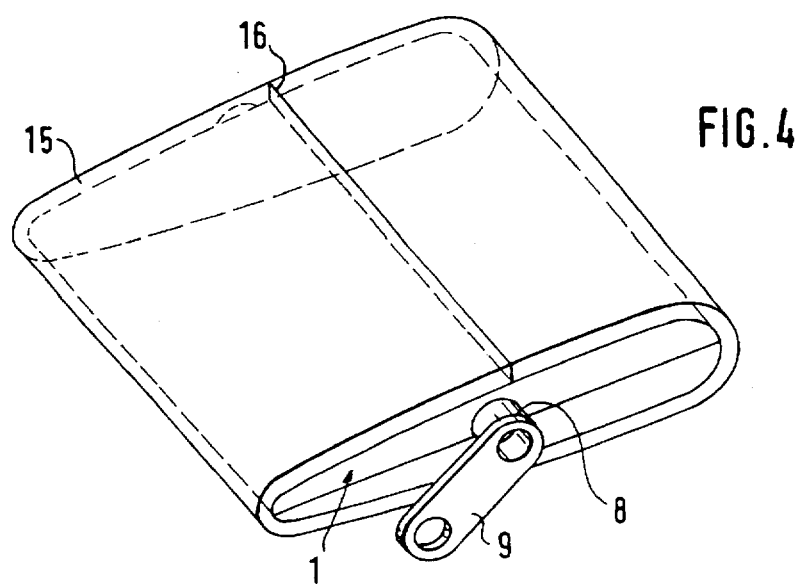
FIG. 4 is a perspective representation of the flap according to FIG. 1 to 3, in which, in addition, the flap is provided with a foam rubber covering.

The flap 1 has a smooth, fluidically favorable outer contour. In order to compensate manufacturing tolerances of the flap 1 and to achieve in each case a secure sealing function within the air guiding duct, the flap 1 according to FIG. 4 is additionally covered with an elastic sealing mass in the form of a foamed material 15, particularly a polypropylene foam. In the shown embodiment, the foamed-material sheathing 15 is placed around the outer contour of the flap 1 situated in the air flow of the air guiding duct, in which case the front ends of the foamed-material covering 15 are joined together in the area of the separating line 16.

Figure 3:
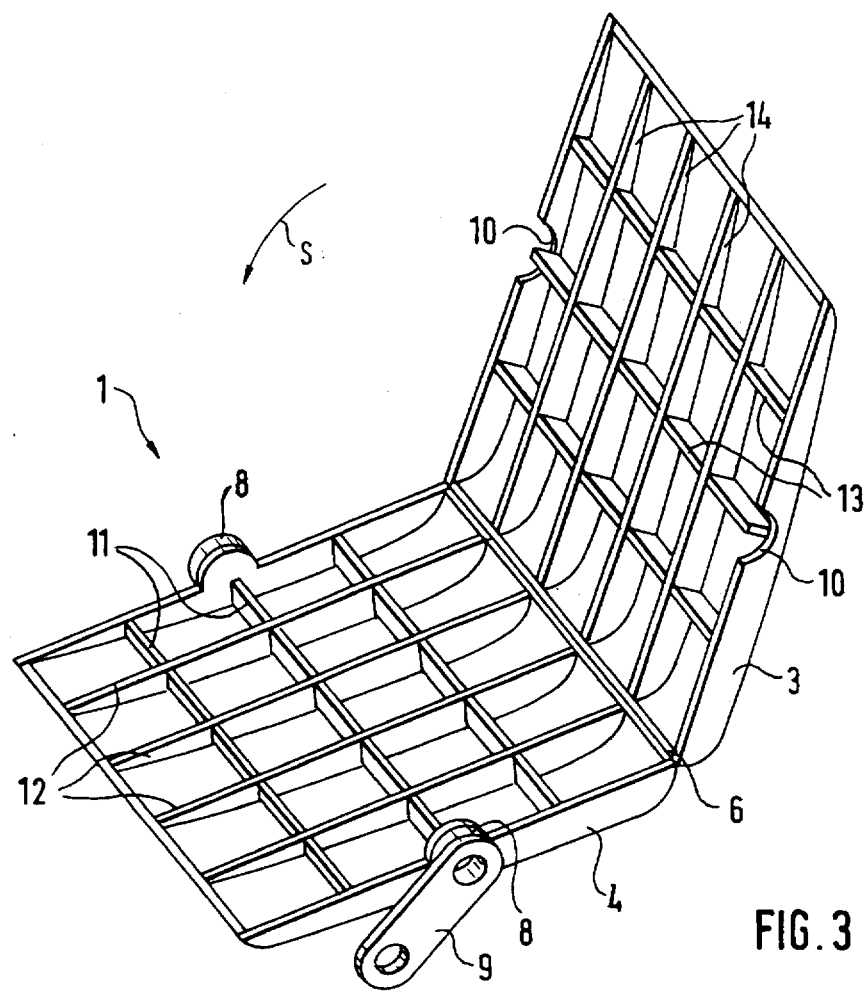
FIG. 3 is a view of the flap according to FIG. 2 in an intermediate position in which it is folded up in contrast to the position according to FIG. 2.
Figure 5:
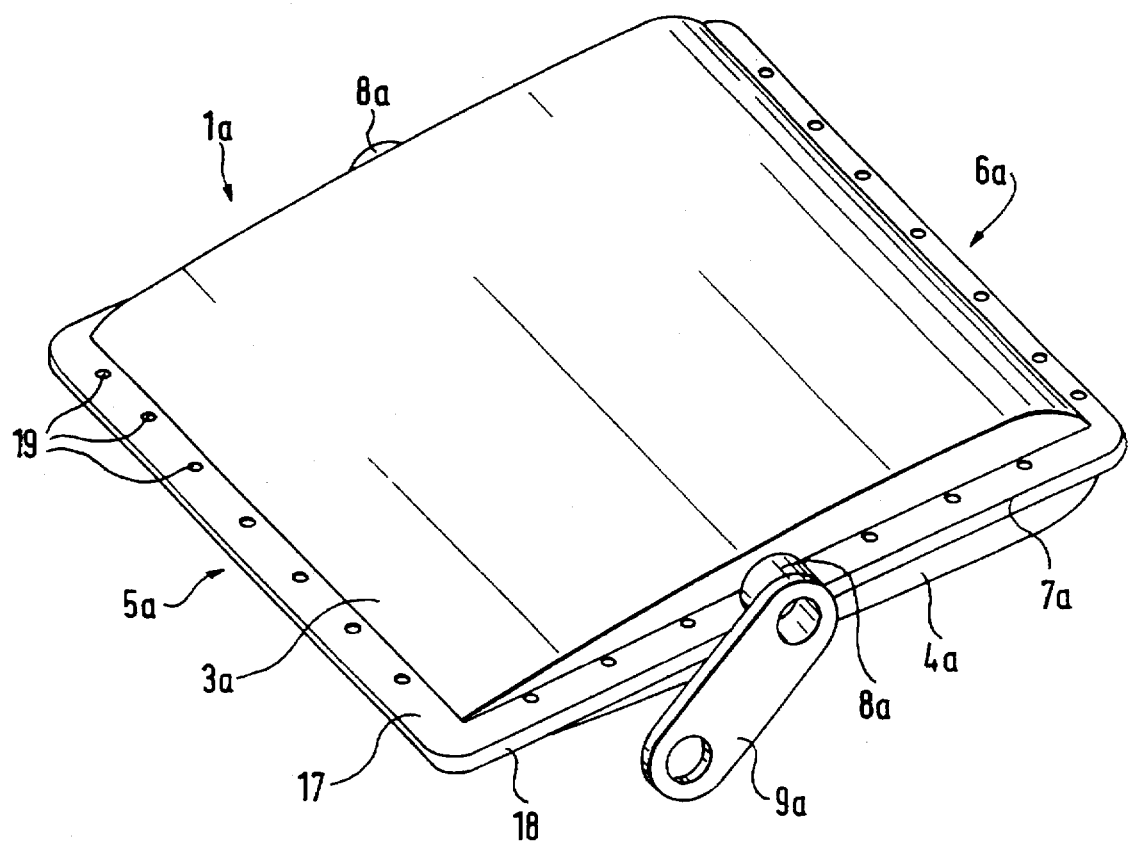
FIG. 5 is a perspective view of another flap similar to FIG. 1 which, in addition, is provided with a surrounding web edge.

The flap 1a according to FIG. 5 corresponds essentially to the flap 1 according to FIGS. 1 to 3 so that a further description in this respect is unnecessary. Also in the case of this flap 1a, two flap halves 3a, 4a are provided which are connected with one another in one piece by means of a film hinge 6a. On the front side 5a of the flap 1a, which is opposite the film hinge 6a, a detent connection is provided which is also not shown.

As in the case of flap 1 of FIGS. 1 to 3, bearing bushes 8a and an adjusting lever 9a are injection molded in one piece to the flap half 4a. However, both flap halves 3a, 4a are additionally provided with one outward-projecting surrounding sealing web 17, 18 respectively, the two sealing webs 17, 18 being each injection molded in one piece to the two flap halves 3a, 4a and resting flatly against one another in the parting plane 7a. By means of the two surrounding sealing webs 17, 18, in the folded-together position of the flap 1a, a surrounding edge is created onto which a sealing lip can be injection molded which is not shown and which consists of an elastic material. In order to hold the molded-on sealing lip securely on the surrounding edge formed by the sealing webs 17, 18, in both sealing webs 17, 18, several recesses are provided which are distributed along its circumference and which, in the shown embodiment, are constructed as breakthroughs 19 extending through the sealing webs 17, 18. When the material of the sealing lip is injection molded around the sealing webs 17, 18, the material of the sealing lip also runs into the breakthroughs 19, whereby the material of the sealing lip, in addition, for an adhesion on the outer contours of the sealing webs 17, 18, is held in a form-locking manner on the edge formed by the sealing webs 17, 18.

The sealing webs 17, 18 are also molded in a common tool mold together with the other parts of the flap 1a in a one-step injection molding operating in one piece to the flap halves 3a, 4a. Since, as a result of the molded-on sealing lip, a cohesion of the two flap halves is already ensured, it is possible to do without a detent connection in the interior of the two flap halves. In such an embodiment according to the invention, the sealing lip is then used as a fixing element arrangement in the sense of the invention.

The same applies to the flap 1 sheathed by the foamed-material covering 15 according to FIG. 4. In the case of another embodiment according to the invention, no detent connection is provided in the interior of the flap according to FIG. 4. On the contrary, the fixing of the two flap halves in their folded-together position takes place by the foamed-material covering which encloses the outer contour of the flap and is flatly glued to it. Naturally, the parting line of the front edges of the foamed-material sheathing in this embodiment must not be situated in the common parting plane of the two flap halves.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Flap for on air guiding duct for a heating and/or air-conditioning system of a motor vehicle, having a flap body joined together from two flap halves, wherein the flap body is formed of two flap halves which are made of plastic and which are connected with one another to form a one-piece injection molded part by means of a film hinge injection molded along a lateral edge of the two flap halves, the two flap halves being foldable together about a hinge axis of the film hinge and being fixable by means of fixing elements in this folded-together position.

2. Flap according to claim 1, wherein the two flap halves are constructed in a half-shell shape and complement one another in their folded-together position to form a hollow body with a fluidically favorable outer contour.

3. Flap according to claim 2, wherein the interior sides of the half-shell-shaped flap halves are provided with mutually corresponding reinforcing ribs for reinforcing the hollow body.

4. Flap according to claim 1, wherein mutually corresponding parts of a detent connection are injection molded as the fixing elements to the two flap halves.

5. Flap according to claim 1, wherein bearing bushes for the bearing of the flap are injection molded in one piece to at least one flap half.

6. Flap according to claim 5, additionally, wherein an adjusting lever for swivelling the flap is injection molded on in one piece in the area of a bearing bush.

7. Flap according to claim 1, wherein the outer contour of the hollow body formed by the flap halves is sheathed by an elastomeric sealing mass of foamed material, forming said fixing elements.

8. Flap according to claim 1, wherein outward projecting surrounding sealing webs are molded along the lateral edges of the two flap halves, recesses are provided on the sealing webs for the injection-molding-on of an elastomeric surrounding sealing lip which are distributed along the circumference of the sealing webs.

9. Flap according to claim 2, wherein mutually corresponding pares of a detent connection are injection molded as the fixing elements to the two flap halves.

10. Flap according to claim 3, wherein mutually corresponding parts of a detent connection are injection molded as the fixing elements to the two flap halves.

11. Flap according to claim 4, wherein bearing bushes, for the bearing of the flap are injection molded in one piece to at least one flap half.

12. Flap according to claim 10, wherein bearing bushes for the bearing of the flap are injection molded in one piece to at least one flap half.

13. Flap according to claim 4, additionally, wherein an adjusting lever for swivelling the flap is injection molded on in one piece in the area of a bearing bush.

14. Flap according to claim 3, wherein the outer contour of the hollow body formed by the flap halves is sheathed by an elastomeric sealing mass of foamed material, forming said fixing elements.

15. Flap according to claim 5, wherein the outer contour of the hollow body formed by the flap halves is sheathed by an elastomeric sealing mass of foamed material, forming said fixing elements.

16. Flap according to claim 6, wherein the outer contour of the hollow body formed by the flap halves is sheathed by an elastomeric sealing mass of foamed material, forming said fixing elements.

17. Flap according to claim 3, wherein outward projecting surrounding sealing webs are molded along the lateral edges of the two flap halves, recesses are provided on the sealing webs for the injection-molding-on of an elastomeric surrounding sealing lip distributed along the circumference of the sealing webs to form said connecting elements.

18. Flap according to claim 5, wherein outward projecting surrounding sealing webs are molded along the lateral edges of the two flap halves, recesses are provided on the sealing webs for the injection-molding-on of an elastomeric surrounding sealing lip distributed along the circumference of the sealing webs to form said connecting elements.

19. Flap according to claim 16, wherein outward projecting surrounding sealing webs are molded along the lateral edges of the two flap halves, recesses are provided on the sealing webs for the injection-molding-on of an elastomeric surrounding sealing lip which are distributed along the circumference of the sealing webs to form said connecting elements.

20. A method of making a flap for a vehicle air conditioning system air guiding duct, comprising:
    injection molding two plastic flap halves together with a film hinge intermediate the halves in a one step injection molding step,
    folding the two halves about the film hinge, and
    connecting the two halves together in a folded condition to form a completed flap.

21. A method according to claim 20, wherein the two flap halves are constructed in a half-shell shape and complement one another in their folded-together position to form a hollow body with a fluidically favorable outer contour.

22. A method according to claim 20, wherein the interior sides of the half-shell-shaped flap halves are provided with mutually corresponding reinforcing ribs for reinforcing the hollow body.

23. A method according to claim 20, wherein mutually corresponding parts of a detent connection are injection molded as fixing elements to the two flap halves.

24. A method according to claim 20, wherein bearing bushes for the bearing of the flap are injection molded in one piece to at least one flap half.

25. A method according to claim 20, additionally, wherein an adjusting lever for swivelling the flap is injection molded on in one piece in the area of a bearing bush.

26. A method according to claim 20, wherein said connecting includes sheathing the outer contour of the folded together flap halves by an elastomeric sealing mass of foamed material.

27. Flap according to claim 20, wherein said flap halves include outward projecting sealing webs containing recesses, and wherein said connecting includes a second injection step of molding on an elastomeric surrounding sealing lip along the circumference of the sealing webs.

28. An air flow control flap for use in an air guiding duct of a vehicle air conditioning system comprising:

the air flow control flap being formed of two flap halves made of plastic and connected with one another to form a one-piece injected molded part by means of a film hinge injection molded along a lateral edge of the two flap halves, the two flap halves being foldable together by the hinge axis of the film hinge and being fixable by means of fixing elements in this folded together position, wherein said flap includes at least one swivel bearing part intermediate respective ends of said flap at a swivelling axis of the flap.

29. A flap according to claim 28, wherein said at least one swivel bearing part includes at least one bearing bush injection molded in one piece to at least one flap half.

30. A flap according to claim 29, wherein two of said bearing bushes are provided at respective opposite lateral sides of the flap.

31. A flap according to claim 28, wherein an adjusting lever is provided intermediate respective ends of said flap.

32. A flap according to claim 31, wherein said adjusting lever is located at one of said at least one swivel bearing parts.

33. An air flow control flap for use in an air guiding duct of a vehicle air conditioning system comprising:

two flap halves made of plastic and connected with one another to form a one-piece injected molded part by means of a film hinge injection molded along a lateral edge of the two flap halves, the two flap halves being foldable together by the hinge axis of the film hinge and being fixable by means of fixing elements in this folded together position, wherein an adjusting lever is provided intermediate respective ends of said flap.

* * * * *